United States Patent [19]

Kurumizawa et al.

[11] Patent Number: 4,608,213

[45] Date of Patent: Aug. 26, 1986

[54] METHOD AND MOLD APPARATUS FOR MOLDING A PADDING MEMBER

[75] Inventors: Masao Kurumizawa; Mitsuru Terui, both of Yokohama; Nobuyasu Yamaguchi, Hamakita, all of Japan

[73] Assignees: Ikeda Bussan Co., Ltd., Yokohama; Nichiei Industry Co., Ltd., Hamakita, both of Japan

[21] Appl. No.: 615,532

[22] Filed: May 31, 1984

[30] Foreign Application Priority Data

Nov. 4, 1983 [JP] Japan .............................. 58-207234
Nov. 4, 1983 [JP] Japan .............................. 58-207235

[51] Int. Cl.⁴ .................... C08J 9/22; B29C 43/20; B32B 5/14; B32B 5/16
[52] U.S. Cl. ................. 264/45.1; 249/129; 249/158; 249/161; 264/113; 264/122; 264/157; 264/321; 264/DIG. 7; 425/257; 425/308; 425/358; 425/817 R
[58] Field of Search ............... 264/45.1, 145, 157, 264/138, 158, 321, DIG. 7, 113, 122; 249/129, 131, 161, 158; 425/257, 308, 358, 817 R

[56] References Cited

U.S. PATENT DOCUMENTS

| | | | |
|---|---|---|---|
| 785,272 | 3/1905 | Robbins | 249/161 X |
| 2,149,533 | 3/1939 | McManus | 264/157 X |
| 2,906,642 | 9/1959 | Dennis | 264/158 X |
| 2,972,315 | 2/1961 | Foerster | 249/131 X |
| 3,393,258 | 7/1968 | Fultz et al. | 264/45.1 X |
| 3,401,128 | 9/1968 | Terry | 264/321 X |
| 3,423,490 | 1/1969 | Trogdon et al. | 264/45.1 |
| 3,517,414 | 6/1970 | Carson, Jr. | 264/321 X |
| 4,289,293 | 9/1981 | Cashion | 249/161 X |

*Primary Examiner*—Philip Anderson
*Attorney, Agent, or Firm*—Wenderoth, Lind & Ponack

[57] ABSTRACT

A mold for producing a padding member having side by side portions of different hardnesses integral with each other, and a method of producing the padding member using such mold. The mold has a lower half with partition walls movably extending upwardly through the bottom of the lower mold half into the interior of the lower mold half to define a plurality of cavities into which moldable materials of which the padding member is to be formed and having different hardnesses from each other can be contained. The upper mold half is placed over the lower mold half, and has pressing members extending downwardly which engage the edges of the partition walls and force the partition walls downwardly. The pressing members are spaced from each other along the partition walls, so that the materials on the opposite sides of the partition walls can contact each other and, while molding is being carried out, become integrally joined to each other.

7 Claims, 14 Drawing Figures

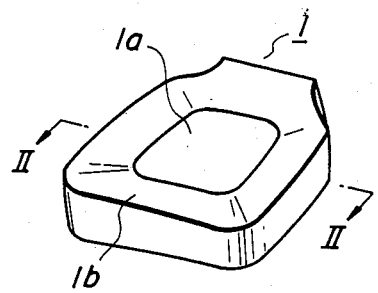
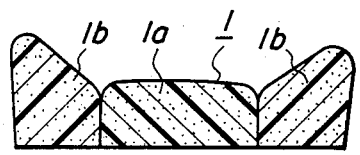
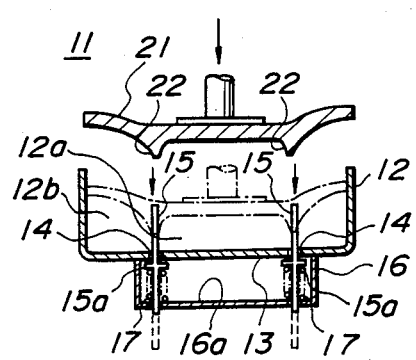
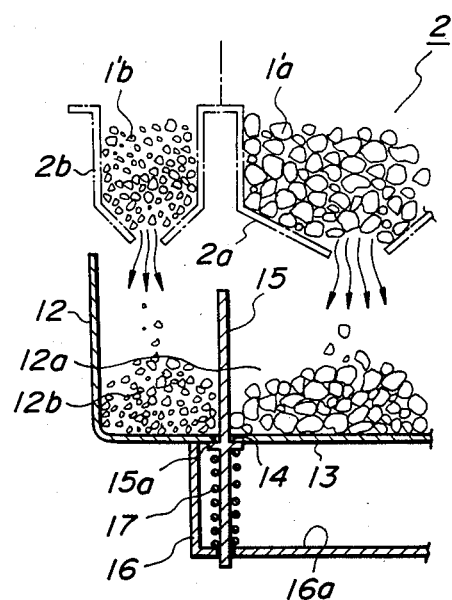

METHOD AND MOLD APPARATUS FOR MOLDING A PADDING MEMBER

This invention relates to a mould for producing a padding member and a method of producing padding members.

The padding member to be produced by the invention comprises a plurality of pad layers disposed side by side in a horizontal direction and integrally moulded to each other, the pad layers having hardnesses different from each other.

The mould of the invention comprises a lower mould half and an upper mould half to engage the upper mould half, the lower mould half having partition wall means movably extending through the bottom of the lower mould half in a fluid-tight manner and spring-urged so as to protrude into a space in the lower mould half to form a plurality of cavities into which materials having hardnesses different from each other are to be contained and the upper mould half having pressing members corresponding to the partition wall means to press on the partition wall means so as to lower it whereby materials in the cavities are integrally adhered to each other by the upper mould half and the pressing members.

BACKGROUND OF THE INVENTION

In the prior art, a mould for producing a padding member comprises a lower mould half into which material is to be contained and an upper mould half to engage the lower mould half so that the padding member is produced in the mould. Thus, it will be noted that the thus produced padding member has relatively uniform hardness. Some padding members such as ones for a car seat preferably include various areas having hardnesses different from each other. In those cases, a hard padding member portion or portions are separately formed and then the padding member is formed with the hard padding member portion or portions being inserted into the mould. However, separately forming the hard padding member portion or portions is troublesome and, in addition thereto, when the separately formed hard padding member portion or portions are inserted into the mould, it is difficult to positively place them in an acccurate position. Alternately, a hard padding member portion or portions and a soft padding member portion or portions are separately formed and then adhered by an adhesive agent to each other. However, the area where the hard and soft padding member portions are adhered to each other tends to be partially hardened. Thus, it will be noted that it is difficult to form a padding member of good quality.

SUMMARY OF THE INVENTION

Accordingly, it is a principal object of the invention to provide a mould adapted to easily produce a padding member including areas having hardnesses different from each other.

It is another object of the invention to provide a method of producing such padding members be mass production.

In accordance with one aspect of the invention, there is provided a mould comprising a lower mould half and an upper mould half to engage said lower mould half, characterized in that said lower mould half has partition wall means movably extending through the bottom of said lower mould half in a fluid-tight manner and spring-urged so as to protrude into a space in said lower mould half to form a plurality of divided cavities into which materials having hardnesses different from each other are to be contained and that said upper mould half has pressing members corresponding to said partition wall means of said lower mould half to press on said partition wall means so as to lower said partition wall means whereby materials in said divided cavities are integrally adhered to each other.

In accordance with another aspect of the invention, there is provided a method of producing padding members comprising a plurality of pad layers disposed side by side in a horizontal direction and integrally adhered to each other, said pad layers having hardnesses different from each other, characterized by comprising the steps of producing a block having a plurality of pad layers of different hardnesses disposed side by side in a horizontal direction and integrally moulded and cutting said block in a horizontal direction to form a plurality of padding members.

BRIEF DESCRIPTION OF THE DRAWINGS

The above and other objects and features of the invention will be apparent from the description of the embodiments taken with reference to the accompanying drawings in which;

FIG. 1 is a perspective view of a padding member produced by a mould of the invention;

FIG. 2 is a cross sectional view of the padding member taken along the line II—II of FIG. 1;

FIG. 3 is a cross sectional view of the mould constructed to produce the padding member in accordance with the invention;

FIG. 4 is an enlarged cross sectional view of a lower mould half in which materials are contained;

DETAILED DESCRIPTION OF THE EMBODIMENTS

Figure 5A:
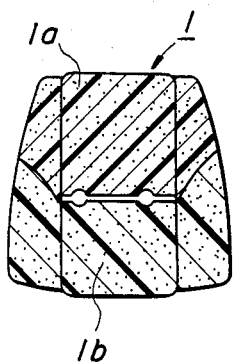
FIGS. 5A and 5B are front views of other padding members produced by the mould of the invention.

FIGS. 1 and 2 show a padding member 1 produced by a mould of the invention. The padding member 1 includes a relatively softer central pad layer portion formed from relatively soft foamed urethane chips, i.e. solid relatively soft foamed pieces of urethane and a relatively harder outer pad layer portion formed from relatively harder foamed urethane chips.

The padding member as shown in FIGS. 1 and 2 can be formed by a mould 11 shown in FIG. 3. The mould 11 comprises a lower mould half 12 and an upper mould half 21 to engage the lower mould half 12.

Four partition walls 15 are so disposed as to form a square partition frame and movably extend through slits 14 in a bottom 13 of the lower mould half 12 to form a central cavity 12a corresponding to the central pad layer portion 1a of the padding member 1 and an outer cavity 12b corresponding to the outer pad layer portion 1b of the padding member 1. The partition walls 15 may also movably extend through a supporting member 16 provided on the lower mould half 12 at the bottom thereof.

Figure 5B:
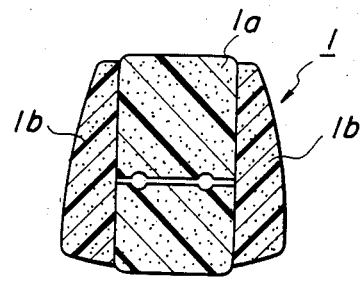

Springs 17 are provided between flanges 15a of the partition walls 15 and the bottom of the supporting member 16 to urge the partition walls 15 to upwardly protrude into a space in the lower mould half 12. Waterproof packings are preferably provided in gaps between the partition walls 15 and the slits edges. Although, in the illustrated embodiment, the partition walls 15 may be approximately square as viewed in a plane to form the cavities 12a and 12b, one or two partition walls 15 may be so disposed as to extend in a longitudinal direction between the front and rear walls of the lower mould half 12 to form two or three cavities in the lower mould half corresponding to divided portions 1a and 1b of a padding member 1 as shown in FIGS. 5A and 5B.

The upper mould half 21 on its inner face has pressing members 22 at positions corresponding to the upper edges of the partition walls 15 in the lower mould half 12. The pressing members 22 may be a pin type and serve to engage and press the partition walls 15 against the springs 17 to lower them toward the bottom of the lower mould half 12.

As shown in FIG. 4, a hopper 2 is disposed above the lower mould half 12 while the upper mould half 21 is opened. The hopper 2 includes a first hopper portion 2a in which first material 1'a of relatively softer foamed urethane chips is contained and a second hopper portion 2b in which second material 1'b of relatively harder foamed urethane chips is contained.

The first and second materials 1'a and 1'b from the first and second hopper portions 2a and 2b are filled into the cavities 12a and 12b, respectively. Binder such as a prepolymer produced by polyetherglycol and tolylenediisocyanate and including 1 to 10% of free isocyanate, for example, may be combined with the chips. Thereafter, the upper mould half 21 is gradually lowered by a press not shown until it engages the lower mould half 12 so that the materials 1'a and 1'b are formed into the padding member 1 as shown in FIG. 1. As the upper mould half 21 is lowered, the pin type pressing members 22 engage and gradually lower the partition walls 15 against the springs 17 so that the first and second materials 1'a and 1'b in the cavities 12a and 12b are integrally adhered to each other through gaps between the adjacent pin type pressing members because the partition between the cavities 12a and 12b is removed as the partition walls 15 are lowered. Since the first and second materials 1'a and 1'b are in the form of foamed urethane chips, they do not have much fluidity, which permits the padding member 1 to have the central pad layer portion 1a and the outer pad layer portion 1b integrally united.

Although, in the illustrated embodiment, the pressing members 22 may be secured to the upper mould half 21, they may be vertically movable relative to the upper mould half 21. Also, the partition walls 15 may be lowered until the tops of the partition walls 15 enter the slits 14 in the bottom 13 of the lower mould half 12, but they may be alternatively lowered part of the way.

As noted from the above description, since the cavities corresponding to the pad layer portions of the padding member having hardnesses different from each other are partitioned by the partition walls, the materials for the portions of the padding member do not flow so that they are combined. This causes the padding member having the portions of different hardnesses to be easily produced. Furthermore, the materials of different hardness are positively adhered to each other because the partition walls are lowered when the upper mould half is engaged with the lower mould half.

Figure 6:
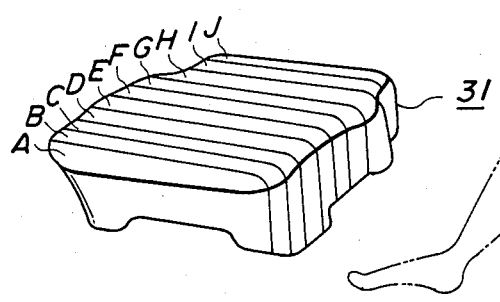
FIG. 6 is a perspective view of another padding member produced by the invention.
Figure 7:
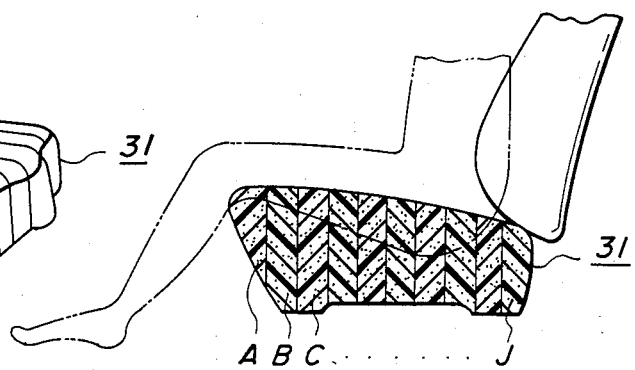
FIG. 7 is a side elevational view of a chair in which the padding member of FIG. 6 is used.
Figure 8:
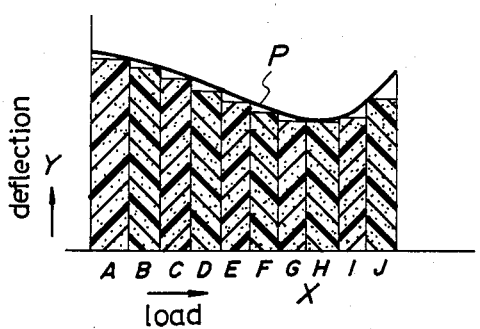
FIG. 8 illustrates a curve of deflection of the padding member used in the chair of FIG. 7.

FIG. 6 shows another padding member 31 for a car seat. The padding member 31 comprises a plurality of pad layer portions A through J disposed side by side in a horizontal direction and intergrally adhered to each other. The padding member 31 can be produced by the mould as shown in FIG. 3, but having nine partition walls in the lower mould half to form ten cavities. The padding member 31 has the hardnesses of the pad layer portions A through J so set that when a person sits down on the seat as shown in FIG. 7, the body of the person is kept at the best condition. FIG. 8 shows a deflection curve P of deflection Y relative to a longitudinal load X of the body on the seat. It will be noted that the deflection curve corresponds to the engaging surface of the body on the seat cushion.

Figure 9:
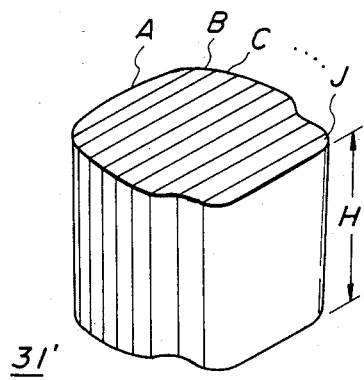
FIG. 9 is a perspective view of a block which is to be formed into the padding member of FIG. 6.
Figure 10:
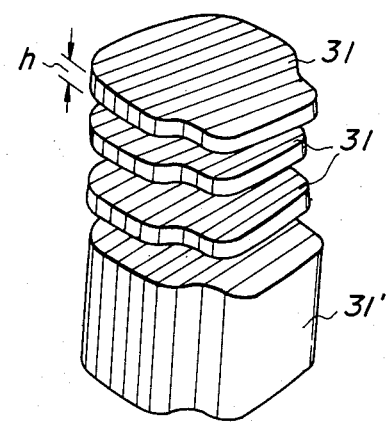
FIG. 10 is a perspective view of the block of FIG. 9 being cut into the padding members of FIG. 6.

FIGS. 9 and 10 illustrate a method of producing the padding members 31 by mass production. As shown in FIG. 9, a block 31' having a height H corresponding to the total thickness of a plurality of padding members 31 is produced by a mould constructed according to the invention in the same manner as shown in FIG. 3. Thereafter, as shown in FIG. 10, the block 31' is cut so as to provide the thickness h of one padding member 31 in a horizontal direction to form a plurality of padding members 31.

Although, in the embodiment of FIGS. 9 and 10, the padding member 31 has a plurality of pad layer portions disposed in a longitudinal direction as viewed in a plane, it may have a plurality of pad layer portions disposed in a latitudinal direction viewed in a plane. In the latter case, the outer pad layer portions may be formed of relatively harder material so that the padding member gives a side-supporting feeling to the user.

Figure 11:
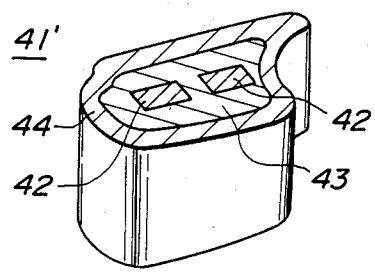
FIG. 11 is a perspective view of a semi-cured block for producing padding members for car door linings.
Figure 12:
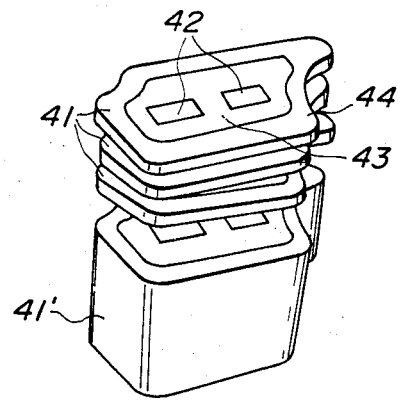
FIG. 12 is a perspective view of the block of FIG. 11 being cut into the padding members for the car door linings; and, FIG. 13 is a perspective view illustrating the produced padding member being thermally heated by a heating die.
Figure 13:
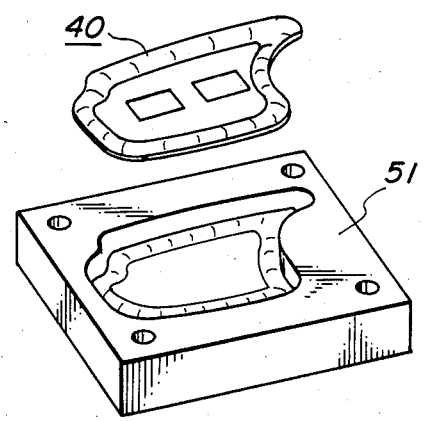

FIGS. 11 through 13 illustrate a method of producing padding members 41 for car door linings. The padding member 41 comprises a pair of square pad layer portions 42, a central pad layer portion 43 formed to surround the square pad layer portions 42 and an outer pad layer portion 44 formed to surround the central pad layer portion 43. The square pad layer portions 42 are formed of relatively harder material providing a physical strength thereto, the central pad layer portion 43 is formed of material suitable for providing a plane thereto, and the outer pad layer portion is formed of material suitable for formability.

As shown in FIG. 11, a block 41' having a height corresponding to the total thickness of a plurality of padding members 41 is produced by a mould constructed according to the invention in the same manner as shown in FIG. 3. The block 41' is preferably semi-cured. As shown in FIG. 12, the block 41' is cut in a horizontal direction to form a plurality of padding members 41. Thereafter, as shown in FIG. 13, the thus produced padding members 41 which are still semi-cured are thermally formed by a forming die 51 to produce a door casing 40 having a configuration corresponding to that of the car door.

It will be understood that the padding member 31 may be also produced by forming a semi-cured block 31', cutting it into a plurality of semi-cured padding members 31 and thermally forming the semi-cured padding members 31. Furthermore, a padding member for a car seat cushion may be produced in the form of ring as viewed in a plane. In this case, the padding member may be formed of material having a shape-supporting property and formability at an outer portion better than at a central portion thereof.

As noted from the above description, the hardness of the padding member can be easily set in accordance with the applications thereof. It will also be understood that the various portions of different hardnesses can be integrally adhered without bonding them, which causes the effectiveness of operation to be improved. Also, the cushion of the padding member produced in accordance with the invention can be improved more than that of the prior padding member in which the portions of different hardness are bonded.

Although some preferred embodiments of the invention have been illustrated and described with reference to the accompanying drawings, it will be understood by those skilled in the art that various changes and modifications may be made without departing from the spirit and scope of the invention, which is intended to be defined only by the appended claims.

What is claimed is:

1. A method of producing a padding member having side by side portions of different hardnesses integral with each other, comprising:

providing a lower mold half having partition wall means movably extending through the bottom of said lower mold half in a fluid-tight manner and spring urged to protrude upwardly into the interior of said lower mold half to form a plurality of cavities;

filling moldable materials of which the padding member is to be formed and having hardnesses different from each other into said cavities;

placing over said lower mold half an upper mold half having pressing members spaced from each other in the horizontal direction along lines corresponding to the upper edges of said partition wall means and projecting downwardly from said upper mold half at positions corresponding to said partition wall means and carrying out molding, said pressing members, during molding, pressing on said partition wall means for lowering said partition wall means while allowing the materials being molded to abut each other, whereby said materials in said cavities are integrally joined to each other during molding.

2. The method as claimed in claim 1 in which said moldable materials are pieces of foamed plastic material.

3. The method as claimed in claim 1 further comprising cutting the resulting molded padding member in horizontal planes to form a plurality of padding members.

4. A mold for producing a padding member having side by side portions of different hardnesses integral with each other, comprising:

a lower mold half having partition wall means movably extending through the bottom of said lower mold half in a fluid-tight manner and spring urged to protrude upwardly into the interior of said lower mold half to form a plurality of cavities in which moldable materials of which the padding member to be formed and having hardnesses different from each other can be contained for molding; and an upper mold half having pressing members spaced from each other in the horizontal direction along lines corresponding to the upper edges of said partition wall means and projecting downwardly from said upper mold half at positions corresponding to said partition wall means for, when said upper mold half is closed over said lower mold half for carrying out molding, pressing on said partition wall means for lowering said partition wall means while allowing the materials to be molded to abut each other, whereby said materials in said cavities are integrally joined to each other during molding.

5. A mold as claimed in claim 4 in which said pressing members are pin type members.

6. A mold as claimed in claim 4 in which said partition wall means comprise a single partition wall forming two cavities.

7. A mold as claimed in claim 4 in which said partition wall means comprises a plurality of partition walls forming at least three cavities.

* * * * *